United States Patent [19]
Earsley et al.

[11] Patent Number: 5,845,890
[45] Date of Patent: Dec. 8, 1998

[54] SWIVEL TREE STAND

[75] Inventors: James Earsley; Steve Fillipp, both of Lubbock, Tex.; Jeff Schabowski, Waukesha Township, Wis.

[73] Assignee: Industrial Molding Corporation, Lubbock, Tex.

[21] Appl. No.: 791,194

[22] Filed: Jan. 31, 1997

Related U.S. Application Data

[60] Provisional application No. 60/011,061, Feb. 2, 1996.

[51] Int. Cl.[6] .................................................. F16M 13/00
[52] U.S. Cl. ........................... 248/516; 248/523; 47/40.5
[58] Field of Search ..................................... 248/516, 523, 248/524, 527; 47/40.5

[56] References Cited

U.S. PATENT DOCUMENTS

| | | |
|---|---|---|
| 2,812,916 | 11/1957 | Jonasson et al. . |
| 2,933,274 | 4/1960 | Mausolf . |
| 2,997,264 | 8/1961 | Zelenitz . |
| 3,204,898 | 9/1965 | Manning . |
| 3,231,227 | 1/1966 | Weining . |
| 3,298,642 | 1/1967 | Taylor . |
| 3,715,095 | 2/1973 | Drablowski . |
| 3,779,493 | 12/1973 | Gidlof . |
| 4,156,323 | 5/1979 | Scheffler . |
| 4,408,415 | 10/1983 | Davis et al. . |
| 4,541,601 | 9/1985 | Corbisello . |
| 4,571,882 | 2/1986 | Capen . |
| 4,699,347 | 10/1987 | Kuhnley . |
| 4,913,395 | 4/1990 | Juhas . |
| 5,249,772 | 10/1993 | Montie, Jr. et al. . |
| 5,301,462 | 4/1994 | Hronyetz . |
| 5,393,031 | 2/1995 | Leve . |
| 5,478,042 | 12/1995 | Bliss et al. ............................... 248/523 |
| 5,490,350 | 2/1996 | Eisenschenk et al. ................... 248/523 |
| 5,492,301 | 2/1996 | Hauser .................................... 248/516 |
| 5,507,117 | 4/1996 | Kalman et al. . |

FOREIGN PATENT DOCUMENTS 2115479  2/1982  United Kingdom .

*Primary Examiner*—Ramon O. Ramirez
*Assistant Examiner*—Willie Berry, Jr.
*Attorney, Agent, or Firm*—Locke Purnell Rain Harrell, P.C.; Monty L. Ross

[57] ABSTRACT

An adjustable tree stand utilizes a receptacle for receiving and securing the bole of a Christmas tree. The receptacle includes a substantially cylindrical sidewall, an upper, radially outwardly extending collar, a bottom wall including an integrally formed, upwardly extending pointed projection for engaging the bottom of the bole of a Christmas tree, a plurality of circumferentially spaced, radially extending, vertical ribs integrally formed with the sidewall, at least one of the ribs having a radially outwardly extending convex portion extending from below the upper collar to the bottom of the sidewall including a plurality of teeth extending along at least a portion of the circumference of the outwardly extending convex portion. The receptacle is adapted to a base including a truncated, substantially hemispherical interior sidewall for receiving the receptacle, the sidewall having upper and lower edges. The base includes an outwardly flared, exterior sidewall, the interior and exterior sidewalls being joined at the upper portion of the base to form an annular, locking ring receiving collar, a plurality of circumferentially spaced, radial support members, the support members extending outwardly from the exterior sidewall and a plurality of circumferentially spaced support ribs extending inwardly from the lower edge of the interior sidewall. The receptacle is secured in the base with a split, outwardly biased locking ring, the locking ring being positioned inside the locking ring receiving collar. A locking lever engages the locking ring, and is selectively moveable to constrict the locking ring and engage the teeth of the receptacle to secure the receptacle in the desired angular orientation relative to the central or vertical axis of the base unit.

20 Claims, 10 Drawing Sheets

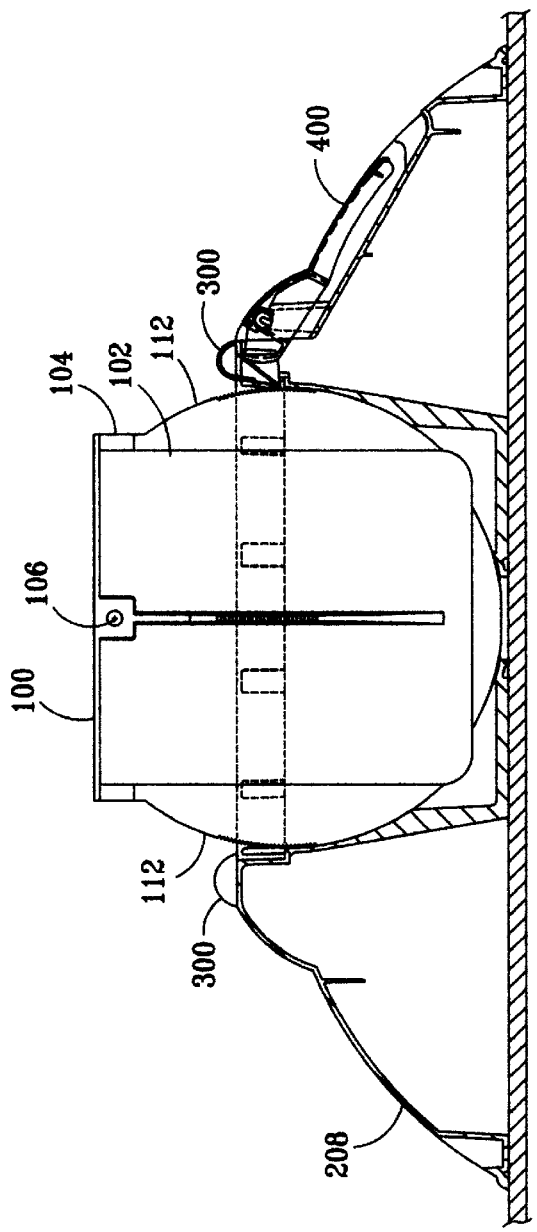
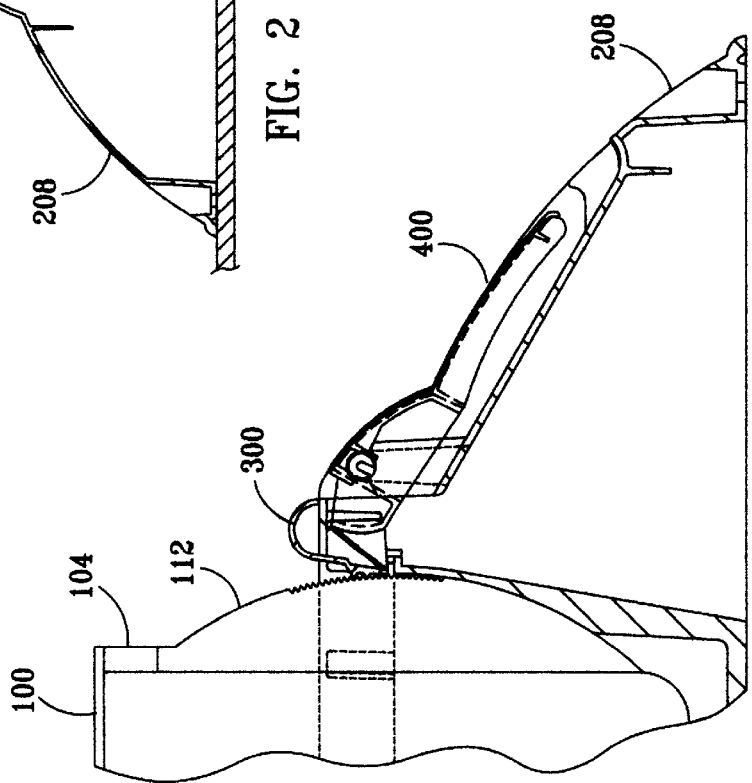
FIG. 2
FIG. 3

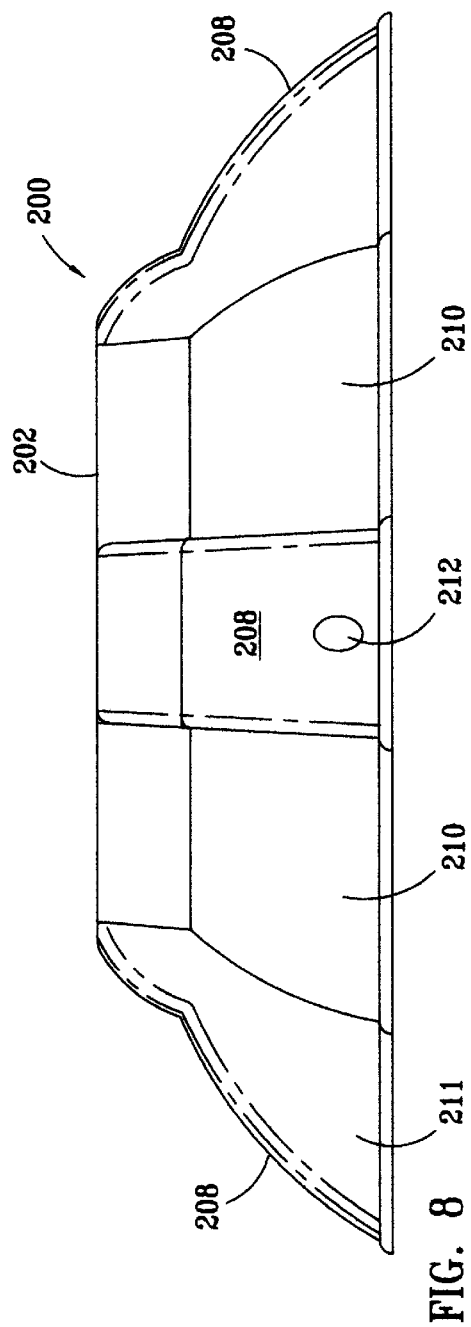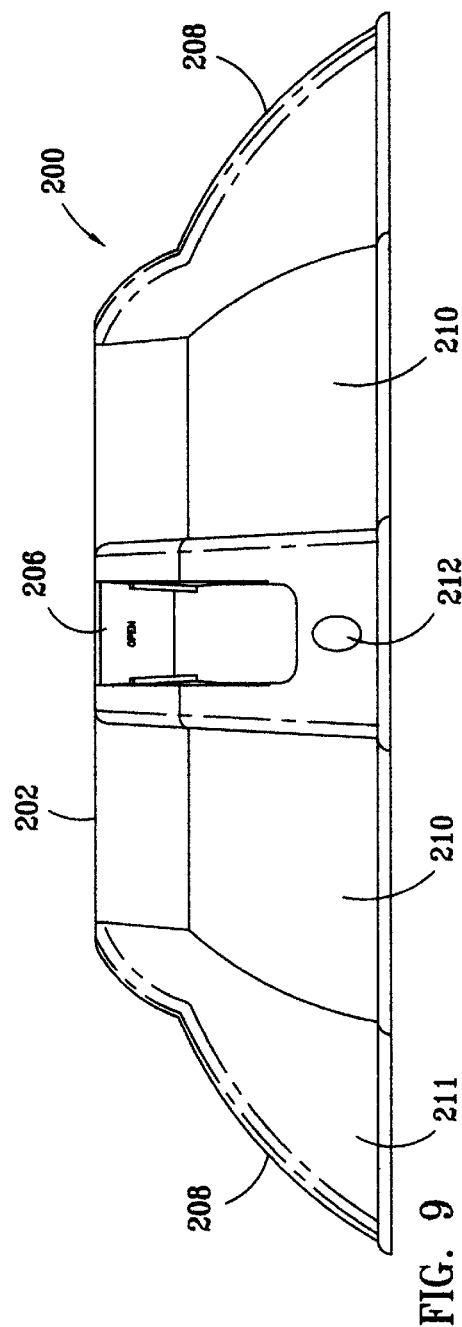

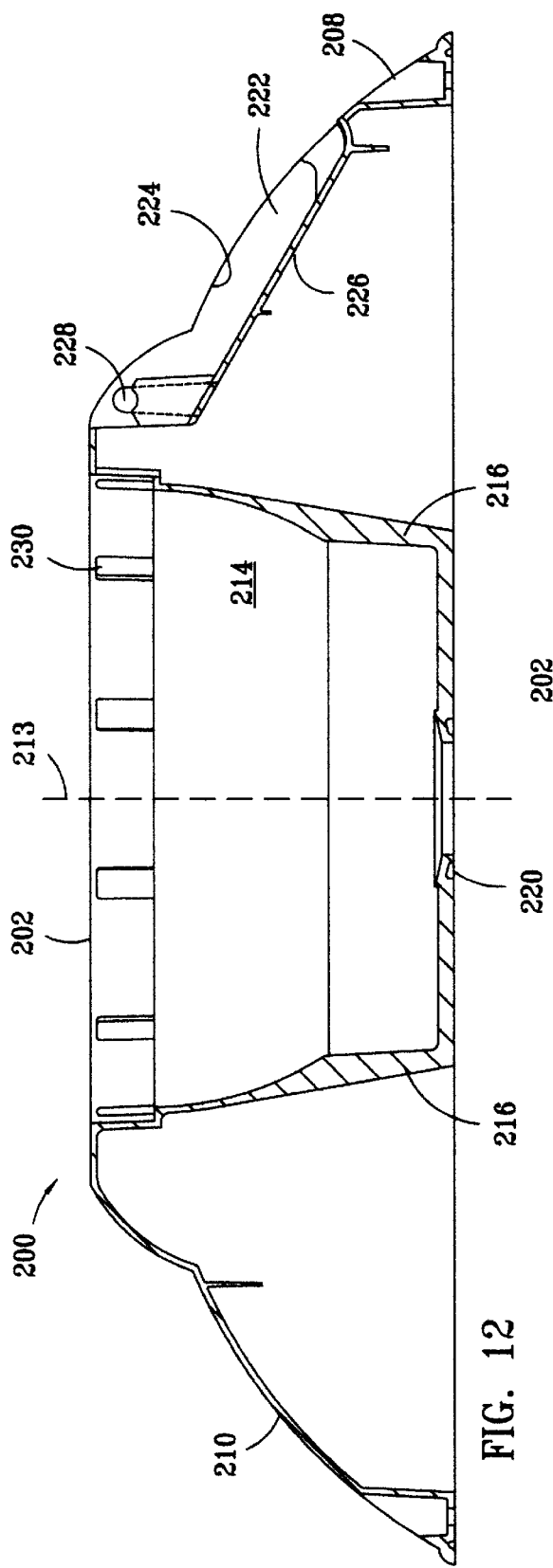
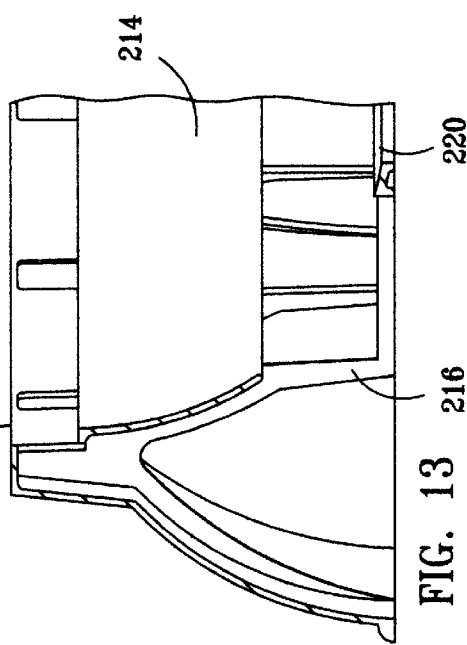
FIG. 12
FIG. 13

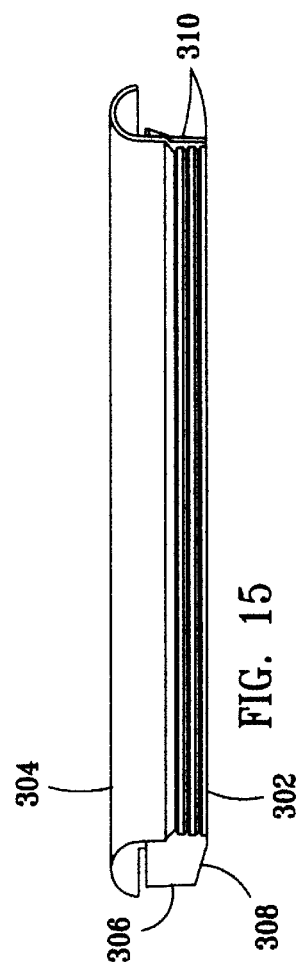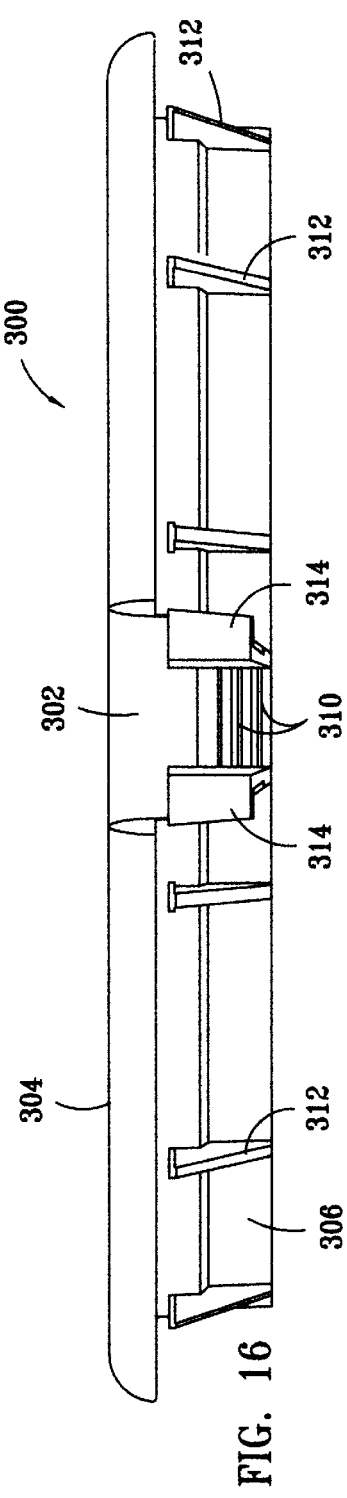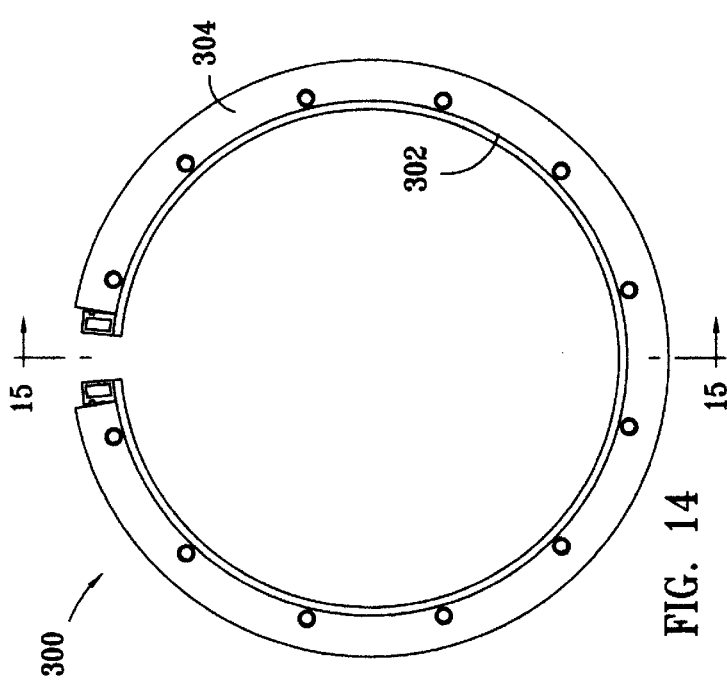
FIG. 15
FIG. 14
FIG. 16 ative position. Thus, there exists a need for a tree stand incorporating a practical, convenient means for adjusting both the vertical and rotational angle of a tree mounted in the stand.

SWIVEL TREE STAND

CROSS REFERENCE TO RELATED APPLICATIONS

This application claims priority based on Provisional application Ser. No. 60/011,061, filed Feb. 2, 1996.

TECHNICAL FIELD

This invention relates to stands for securing cylindrical objects, and more particularly, to tree stands such as Christmas tree stands, providing means for conveniently adjusting the angular orientation and rotational position of a tree relative to a base member resting in a fixed position on an underlying support surface.

BACKGROUND OF THE INVENTION

Tree stands having a plurality of threaded bolts that are tightened independently to secure the trunk or bole of the tree inside the stand are well known. The bole of the tree is positioned inside the stand and the bolts are tightened down onto the bole to secure the tree in position. However, such tree stands typically do not incorporate a practical, convenient means of adjusting the vertical or rotational orientation of the tree after the bole of the tree has been secured in the stand. Consequently, if the bole of the tree is crooked, the tree will be at an angle to the perpendicular. Likewise, if the bole is misaligned when the bolts are tightened, the tree will be angled relative to a vertical axis perpendicular to the floor. Additionally, it is often desirable to rotate the tree during the process of decorating the tree or to present the tree in the most attractive position. Thus, there exists a need for a tree stand incorporating a practical, convenient means for adjusting both the vertical and rotational angle of a tree mounted in the stand.

SUMMARY OF THE INVENTION

The tree stand of the invention preferably comprises a base member having a central recess, a receptacle adapted to fit into the central recess, means for attaching the receptacle to the trunk of a tree, means allowing the receptacle to be selectively pivoted and rotated inside the recess following attachment to the tree, a split retainer ring connected to the base member adjacent to the recess and extending substantially around the receptacle, and means for selectively constricting the split retainer ring around the receptacle to engage the receptacle and thereby prevent further pivotal movement between the receptacle and the base member. Circumferentially spaced, threaded eyebolts are preferably inserted through the collar of the receptacle and are tightened to secure the lower trunk portion of a tree inside the receptacle.

According to one embodiment of the invention, the base member comprises a reinforced skirt or exterior sidewall having along its top edge a circumferentially extending collar defining the top of a centrally disposed recess having a diameter sufficiently large to receive the receptacle. The collar is also preferably attached to the top edge of a centrally disposed, smooth, arcuate inner sidewall section having attached to its lower edge a plurality of circumferentially spaced support ribs extending radially inward to a horizontally disposed, annular support ring. The underside of the support ribs and the underside of the support ring are substantially coplanar with the bottom of the inclined skirt to provide additional support to the receptacle when it contains a tree. The receptacle preferably comprises a substantially cylindrical inside wall having a solid bottom, with an upwardly directed spike or pointed projection centered in the bottom wall of the receptacle. The outside of the receptacle includes a rounded, downwardly facing bottom surface and a plurality of circumferentially spaced, longitudinal ribs each including a radially extending, convex, arcuate edge portion with an array of teeth projecting from a portion of the arcuate edge. The curvature of the radially extending arcuate rib edges cooperates with the curvature of the sidewall section of the recess so that the receptacle rotates and pivots inside the recess while its downwardly facing bottom surface rests on the annular support ring of the base member. Annular ridges on the inwardly facing surface of the split retainer ring provide interlocking engagement with the outwardly facing teeth on the ribs of the receptacle when the split retainer ring is constricted by a cam mechanism including a locking lever that is easily accessible on the outside of the base member. Once locked, the receptacle is maintained in a desired angular orientation relative to the central axis of the collar of the base member until the locking lever is released, permitting the outwardly biased split retainer ring to expand out of engagement with the outwardly facing teeth of the receptacle. According to one embodiment of the invention, the collar of the receptacle also comprises a plurality of circumferentially spaced, integrally molded, vertical pockets each adapted to receive and support a threaded nut, with apertures extending radially through the pockets and aligned to receive an eyebolt radially through each pocket and the associated threaded nut.

BRIEF DESCRIPTION OF THE DRAWINGS

The apparatus of the present invention is further described and explained in relation to the following figures of the drawings wherein:

FIG. 2 is a front cross-sectional elevation view of a preferred swivel tree stand of the invention, shown resting on an underlying support surface;

FIG. 3 is an enlarged view of the right portion of FIG. 2, depicting the locking mechanism in greater detail;

FIG. 8 is a side elevation view of a base of the swivel tree stand of the present invention;

FIG. 9 is the opposing side elevation view of the base of FIG. 8;

FIG. 12 is a cross sectional view of the base of FIG. 8;

FIG. 13 is a partial cross sectional view of the base of FIG. 8;

FIG. 14 is a top view of the locking ring used in connection with the swivel tree stand of the present invention;

FIG. 15 is a partial cross sectional view of the locking ring of FIG. 14;

FIG. 16 is a front elevation view of the locking ring of FIG. 14;

Like reference numerals are used to indicate like parts in all figures of the drawings.

DETAILED DESCRIPTION

Figure 1:
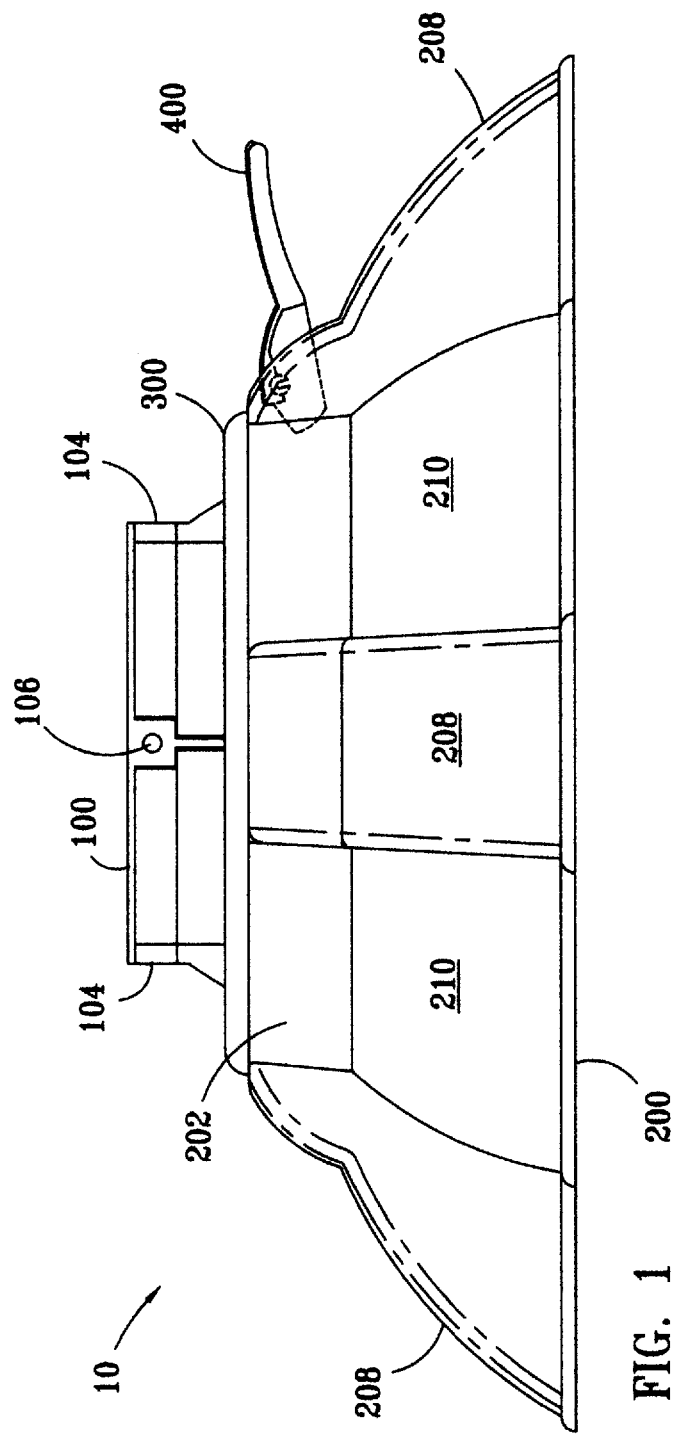
FIG. 1 is a front elevation view of a swivel tree stand of the invention, shown resting on an underlying support surface.
Figure 4:
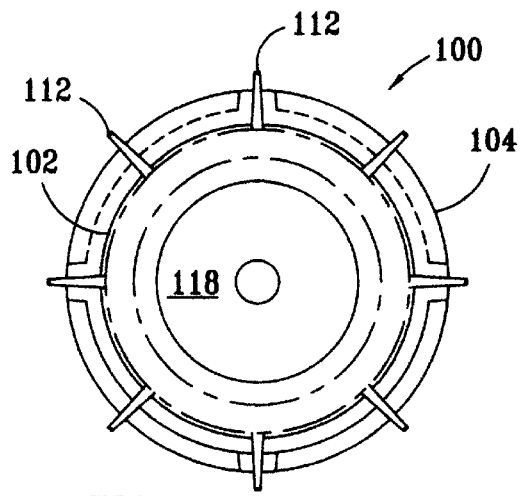
FIG. 4 is a bottom plan view of a preferred receptacle for use in the invention.

Referring now to FIGS. 1–3, the tree stand 10 of the present invention is illustrated. The tree stand includes a removable receptacle 100 and a base 200 adapted to receive and secure the receptacle 100 in a desired vertical and rotational position. The base 100 includes a locking ring receiving collar, adapted to receive a split outwardly biased locking ring 300 and a locking lever 400 for engaging the locking ring 300. As illustrated, the base includes a plurality of circumferentially spaced, radially extending support members or feet 208 extending radially outwardly from an outwardly flared exterior sidewall 210.

The receptacle 100 includes a substantially cylindrical sidewall 102 including an upper, radially extending collar 104. Although, as illustrated, the sidewall is substantially cylindrical, it is contemplated that the sidewall could be formed with a different cross-sectional geometry, i.e., square, hexagonal or octagonal. The radially extending collar 104 includes a plurality circumferentially spaced, radially extending ribs integrally formed with sidewall 102 for engagement with locking ring 300.

Turning now to FIGS. 4–8, the structure of receptacle 100 of the tree stand 10 of the present invention is illustrated in greater detail. As shown, the circumferentially spaced, radially extending ribs 112 are formed with an outwardly extending arcuate convex edge 114 extending from below the upper collar to the bottom of the sidewall. A plurality of horizontal teeth 116 are formed along at least a portion 115 of the arcuate edge of the ribs 112 for engagement with the locking ring 300 as will be described in greater detail below. In the illustrated embodiment, a total of eight circumferentially spaced ribs are formed; however, it is contemplated that a larger or smaller number of ribs may be used, depending upon the size of the unit, the particular application and other factors.

Receptacle 100 is formed with an upper, radially extending collar 104 including a plurality of circumferentially spaced pockets 108 for receiving threaded nuts 110. A horizontal, radially extending aperture 106 is formed in each for the pockets to receive a bolt 120 for threaded engagement with the nut 110. The bolts 120 are adapted to adjustably engage the lower portion of a tree trunk inserted into the receptacle 100 thereby securing the tree into the receptacle.

Figure 6:
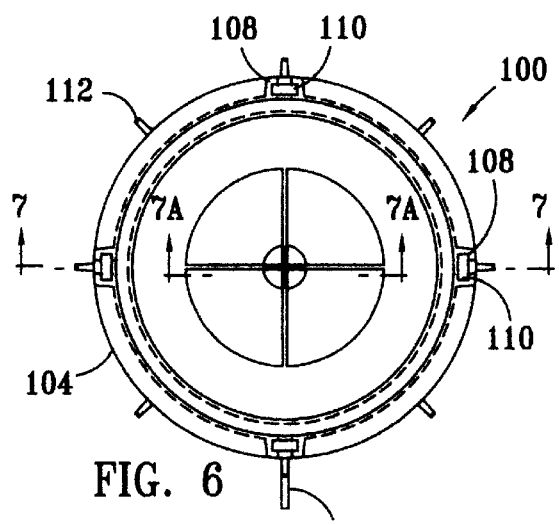
FIG. 6 is a top plan view of the tree receptacle of FIG. 4.
Figure 7A:
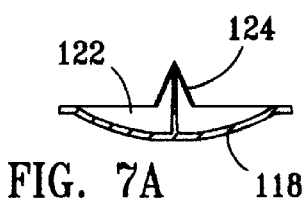
FIG. 7A is a cross-sectional detail view of the bottom center portion of the receptacle of FIG. 7.
Figure 7:
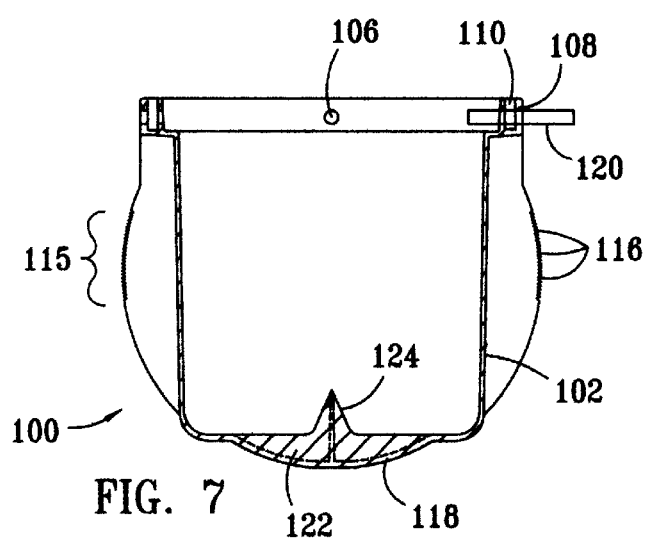
FIG. 7 is a cross-sectional front elevation view of the receptacle of FIG. 7.
Figure 11:
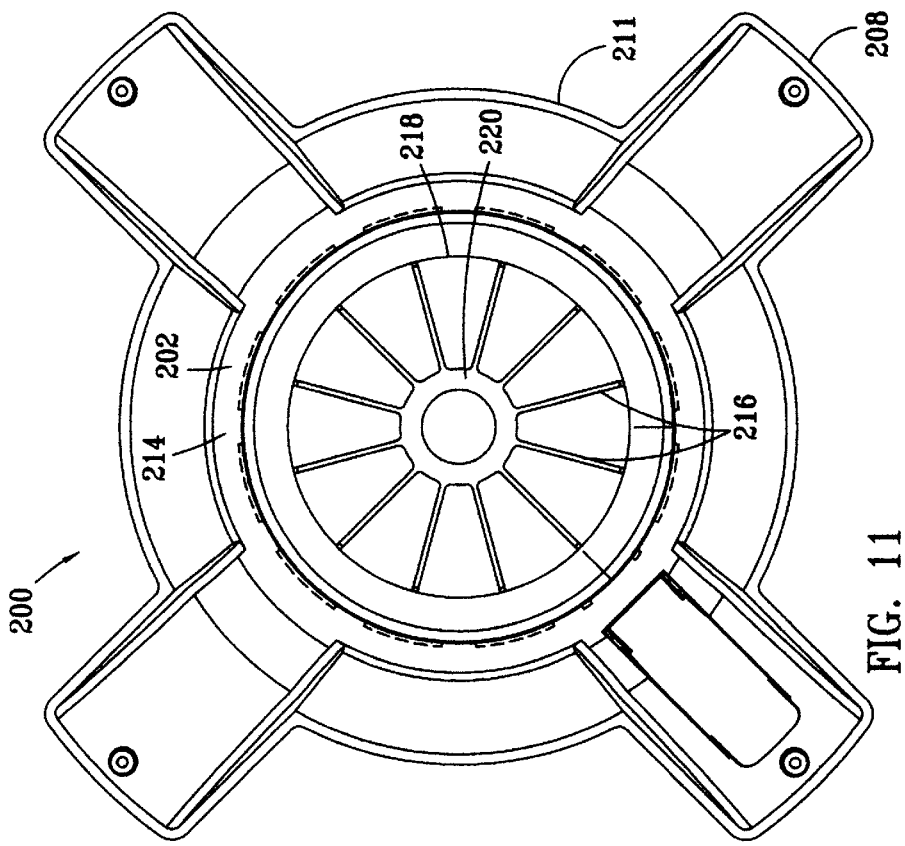
FIG. 11 is a top view of the base of FIG. 8.
Figure 10:
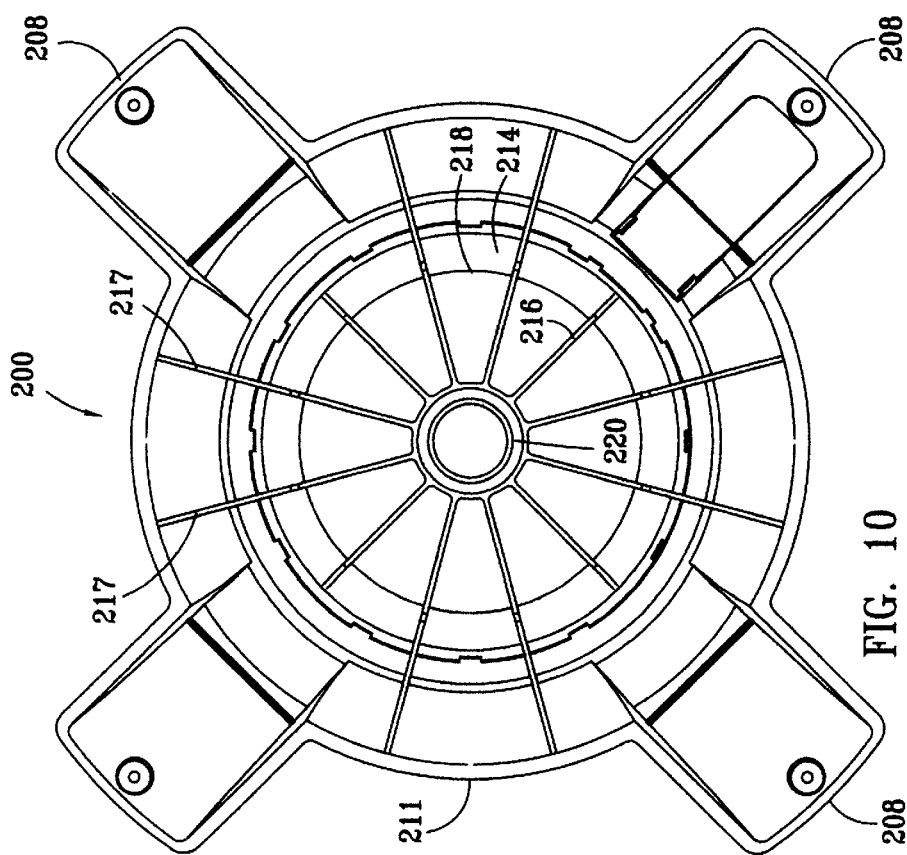
FIG. 10 is a bottom view of the base of FIG. 8.
Figure 17:
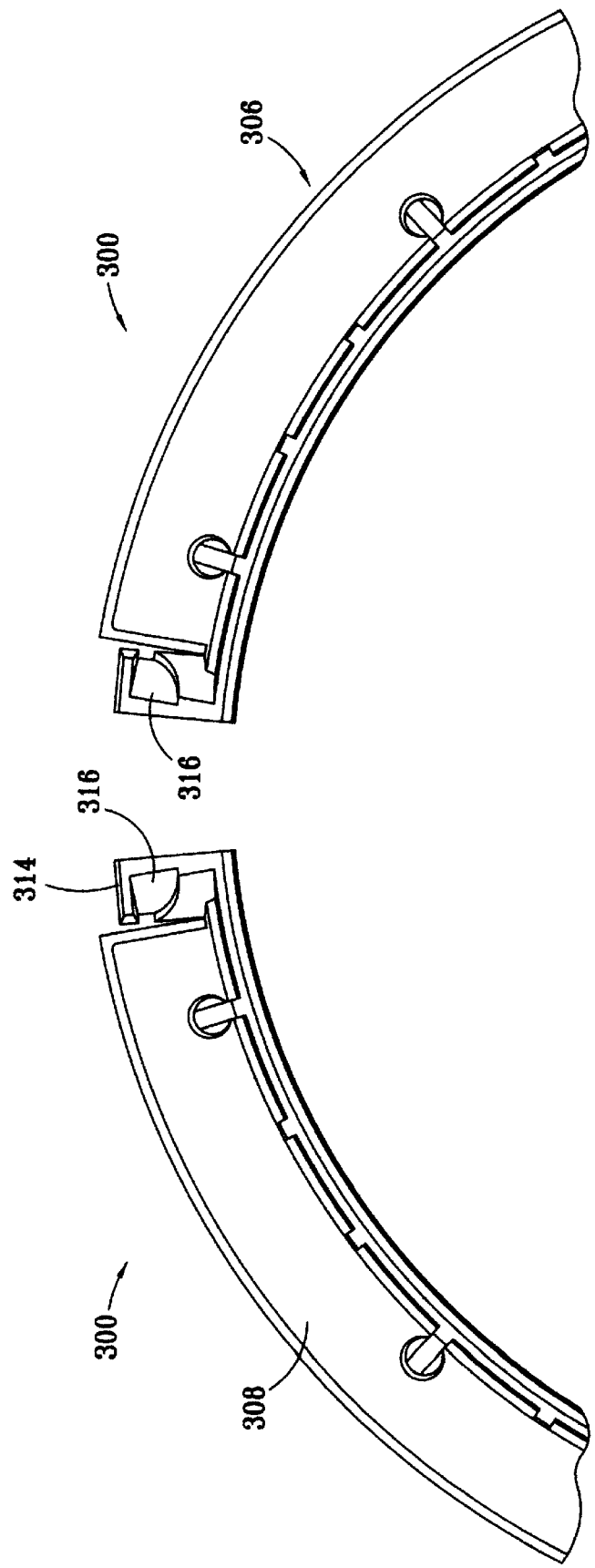
FIG. 17 is an enlarged partial bottom view of the locking ring of FIG. 14.
Figure 18:
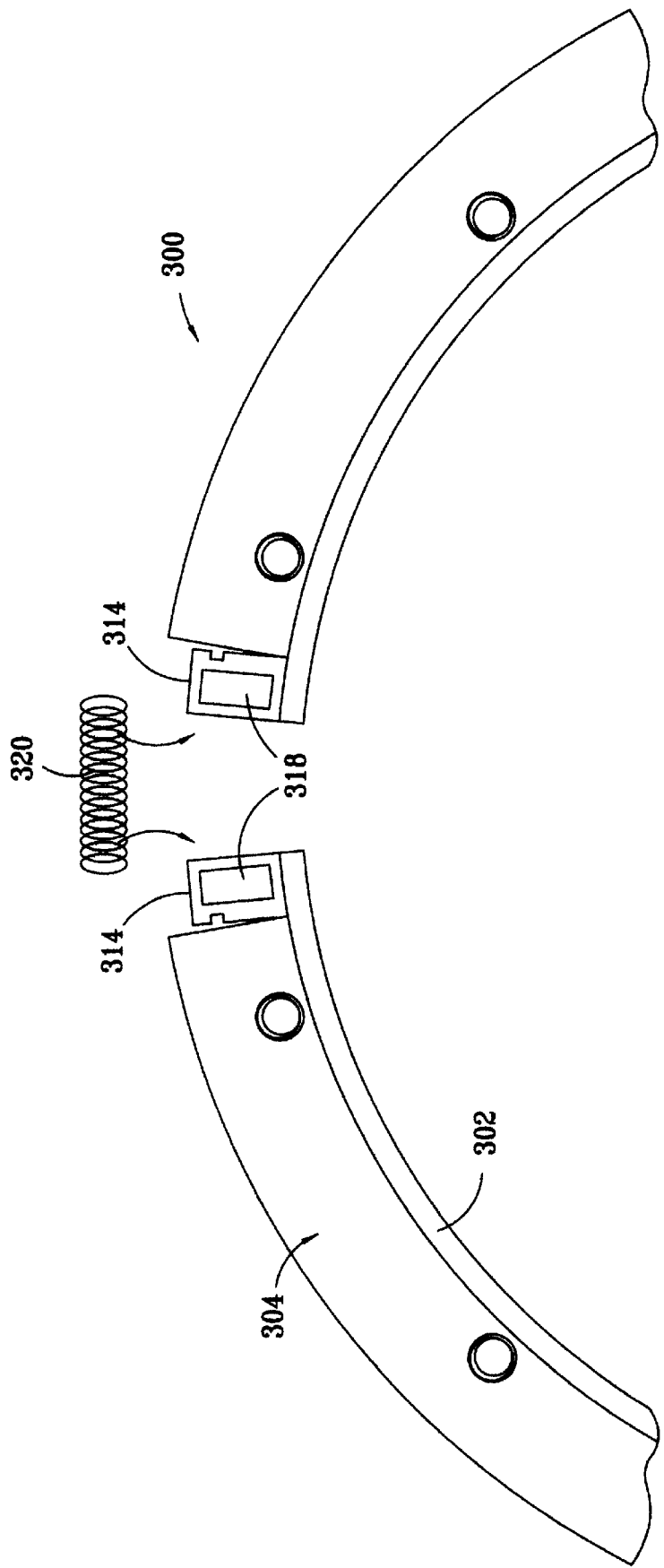
FIG. 18 is an enlarged partial top view of the locking ring of FIG. 14.

Referring now specifically to FIGS. 6–8, the receptacle 100 is formed with a curved bottom wall 118, including a plurality of radially extending ribs 122 that intersect at the center of the bottom wall 118 and form a bole or trunk engaging spike 124. When a tree is inserted into the receptacle 100, the spike 124 engages the bottom of the tree's bole to aid in centering and securing the tree in the receptacle. Although the receptacle 100 is illustrated with a curved bottom, it is anticipated that other geometries may be utilized.

Turning now to FIGS. 8–13, the construction of the base 200 of the tree stand is shown in greater detail. The base 200 of the tree stand 10 is formed with a smooth, truncated, substantially curved or semi-hemispherical annular interior sidewall 214 extending down and radially inward toward the center of the stand. The curved or semi-hemispherical interior sidewall 214 is formed to substantially conform to the curvature of the lower portion of outwardly extending arcuate convex edge 114 of the ribs 112 of receptacle 100 to support the receptacle in the base. The curved or semi-hemispherical interior sidewall 214 defines a central axis 213 (FIG. 12) passing through the center of the base 200.

A plurality of circumferentially spaced, support ribs 216 extend radially inward between the bottom edge 218 of the interior sidewall 214 and a horizontal, centrally disposed annular support ring 220. The annular support ring is substantially coplaner with the bottom edge 211 of the exterior sidewall 210 of the base 200. As illustrated, a plurality of secondary support ribs 217, radially aligned with at least some of the support ribs 216, extend between the interior sidewall 214 and the exterior sidewall 210 to provide additional support.

The sidewall 214, support ribs 216 and annular support ring 220 define a central recess in the base 200 adapted to receive and support the receptacle 100. It will be appreciated that the receptacle 100 may be pivoted or rotated in the central recess unless locked in place as explained in greater detail below. Thus, when a tree is secured in receptacle 100 and the receptacle is inserted in the central recess of base 200, the tree can be pivoted or rotated into the desired position.

As best illustrated in FIG. 12, a locking lever receiving aperture 222 is formed in one of the feet 208 of the stand. The aperture is defined by an inclined bottom wall 226 and a pair of opposing sidewalls 224. Holes 228 are formed in each of the opposing sidewalls 224 for receiving locking lever pivot pins 412 (FIGS. 19 and 20) and pivotally mounting a locking lever 400. Also, as best illustrated in FIGS. 12 and 13 the interior surface of the locking ring receiving collar includes a plurality of rectangular apertures for receiving locking ring engaging members 312 (FIG. 16) and securing the locking ring 300 in place in the locking ring receiving collar 202.

Figure 5:
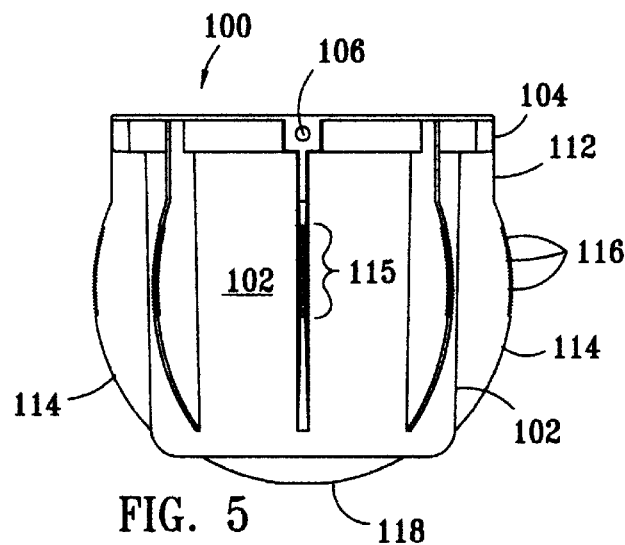
FIG. 5 is a front elevation view of the receptacle of FIG. 4.

Turning now to FIGS. 14–18, the annular locking ring 300 utilized in connection with the stand of the present invention is illustrated in detail. The locking ring 300 includes an annular inner wall or surface 302, a curved upper wall 304, a sidewall 306 and a bottom wall 308. The annular inner wall 302 includes a plurality of horizontal ridges 310 for engagement with ribs 112 of receptacle 100 (FIG. 5). More specifically, ridges 310 are designed to engage teeth 116 for locking engagement of the receptacle 100 in the base 200. A plurality of circumferentially spaced, vertically inclined, engaging members 312 are provided for engaging rectangular apertures 230 in locking ring receiving collar 202 for fastening the locking ring 300 in the base 200. When the locking ring 300 is inserted into locking ring receiving collar 202, the outwardly biased locking ring is initially compressed, then expands as the engaging members 312 enter rectangular apertures 230, securing the locking ring into position.

Locking ring 300 is also provided with a pair of radially opposed shoes 314 including inclined camming surfaces 316 extending upwardly from the bottom of the shoes. The shoes 314 also include spring engaging sockets 318 in the upper surface of the shoes for receiving spring 320. Spring 320 outwardly biases the locking ring 300 in the radial direction. In the outwardly biased position, the radius of the locking ring 300 is sufficient to allow the receptacle 100 to rotate or pivot within the base 200.

Figure 19:
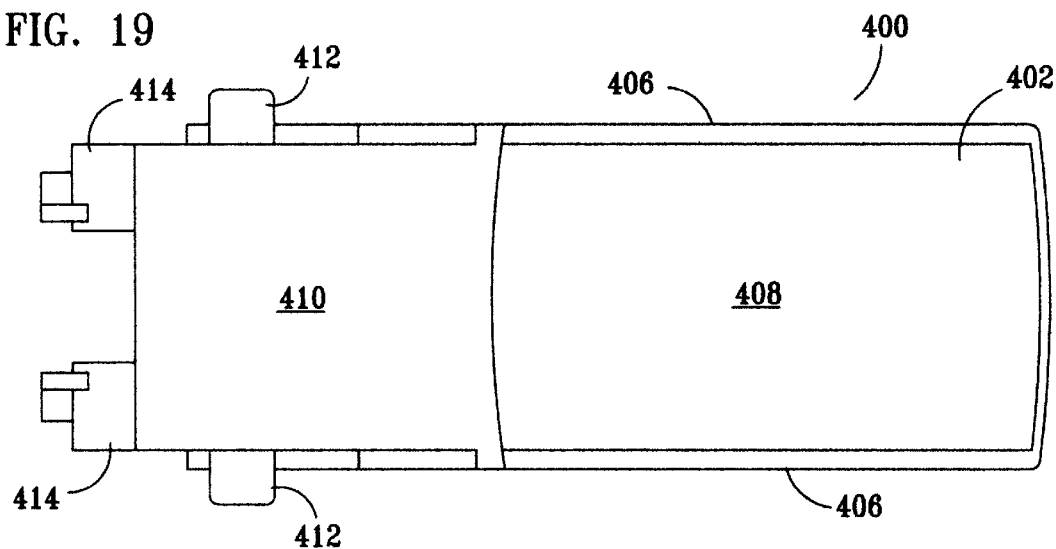
FIG. 19 is a top plan view of the locking lever shown in FIGS. 1–3.
Figure 20:
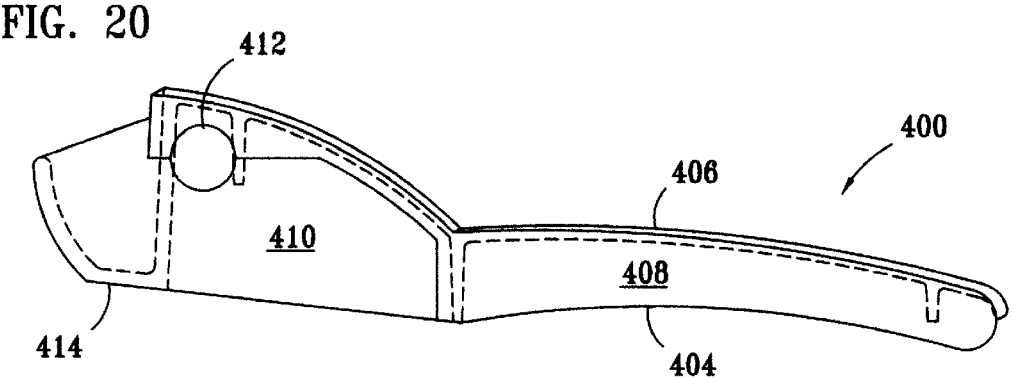
FIG. 20 is a cross sectional view of the locking lever of FIG. 19.

Turning now to FIGS. 19 and 20 the locking lever 400 of the stand of the invention is further illustrated. Locking lever 400 includes top 402, bottom 404, sides 406 which form handle section 408 and engaging section 410. Pivot pins 412 extend laterally from the sides 406 of the engaging section 410 for pivotal engagement with holes 228 (FIG. 12) in receiving aperture 222 of base 200. Cam members 414 extend longitudinally from engaging section 410 for engaging shoes 314 (FIGS. 16 and 17) of locking ring 300. When the locking lever 400 is depressed from the position shown in FIG. 1 to the position shown in FIG. 2, cam members 414 engage the inclined camming surfaces 316 of shoes 314 (FIG. 17) to compress the locking ring 300 around the receptacle 100.

The tree stand of the present invention is utilized as follows. First the bole of a Christmas tree or similar cylindrical object is inserted into receptacle 100. Eyebolts 120 are tightened to engage the bole of the tree and secure the tree in the receptacle. The receptacle is then inserted into the base 200. Due to the unique design of the stand, the tree may then be rotated and pivoted to the desired position. After the tree is positioned, the locking lever 400 is depressed, compressing the locking ring. The horizontal ridges 310 of the locking ring 300 engage the teeth 116 extending from the convex portion 114 of ribs 112 of receptacle 100, securing the receptacle 100 into the desired position.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A stand for supporting a cylindrical object such as the bole of a Christmas tree comprising:
    a receptacle for receiving and securing the bole of a Christmas tree, the receptacle including a substantially cylindrical sidewall, a bottom wall, an upper collar and, the receptacle further comprising a plurality of circumferentially spaced, radially extending vertical ribs integrally formed with said sidewall, at least one of the ribs having a radially outwardly extending convex portion including a plurality of teeth extending along at least a portion of the circumference of the outwardly extending convex portion;
    a base including an annular interior sidewall for receiving the receptacle, the sidewall having upper and lower edges and defining a central axis passing through the center of the interior sidewall, the base further comprising an exterior sidewall, the interior and exterior sidewalls being joined at the upper portion of the base to form an annular, locking ring receiving collar;
    a split, outwardly biased locking ring comprising an annular inner surface, the locking ring being positioned inside the locking ring receiving collar;
    the locking ring comprising at least one horizontal ridge on the annular inner surface; and
    a locking lever for engaging the locking ring, the locking lever being selectively moveable to constrict the locking ring and engage the at least one ridge of the locking ring with the teeth of the receptacle to secure the receptacle in the desired angular orientation relative to the central axis of the base unit.

2. The stand of claim 1 wherein the locking ring further comprises a pair of radially opposed shoes.

3. The stand of claim 2 wherein the pair of radially opposed shoes further comprises inclined camming surfaces extending upwardly from the bottom of the shoes and wherein the locking lever further comprises cam members for engaging the shoes to compress the locking ring around the receptacle.

4. The stand of claim 1 wherein the bottom wall of the receptacle further comprises an integrally formed, upwardly extending pointed projection for engaging the bottom of the bole of a Christmas tree.

5. The stand of claim 1 wherein the receptacle further comprises a radially extending collar including a plurality of circumferentially spaced pockets, each of the pockets including a vertical aperture for receiving a threaded nut and a radially extending aperture for receiving a bolt for threaded engagement with the threaded nut.

6. The stand of claim 1 wherein the base further comprises a plurality of circumferentially spaced, radial support members, the support members extending outwardly from the exterior sidewall.

7. The stand of claim 1 wherein the base further comprises a plurality of circumferentially spaced support ribs and a centrally disposed interior support ring, the support ribs extending between the lower edge of the interior sidewall and the centrally disposed support ring.

8. The stand of claim 1 wherein the locking ring further comprises a spring for biasing the locking ring.

9. A stand for supporting a cylindrical object such as the bole of a Christmas tree comprising:
    a receptacle for receiving and securing the bole of a Christmas tree, the receptacle including a substantially cylindrical sidewall, a bottom wall, and an upper, radially outwardly extending collar and, the receptacle further comprising a plurality of circumferentially spaced, radially extending vertical ribs integrally formed with said sidewall, at least one of the ribs having a radially outwardly extending convex portion including a plurality of teeth extending along at least a portion of the circumference of the outwardly extending convex portion;
    a base including a curved annular interior sidewall for receiving the receptacle, the sidewall having upper and lower edges and defining a central axis passing through the center of the interior sidewall, the base further comprising an exterior sidewall, the interior and exterior sidewalls being joined at the upper portion of the base to form an annular, locking ring receiving collar;
    a split, outwardly biased locking ring, the locking ring being positioned inside the locking ring receiving collar, the locking ring further comprising an annular inner surface including a plurality of horizontal ridges for engaging the teeth of the receptacle; and
    a locking lever for engaging the locking ring, the locking lever being selectively moveable to constrict the locking ring and engage the ridges of the locking ring with the teeth of the receptacle to secure the receptacle in the desired angular orientation relative to the central axis of the base unit.

10. The stand of claim 9 wherein the bottom wall of the receptacle further comprises an integrally formed, upwardly extending pointed projection for engaging the bottom of the bole of a Christmas tree.

11. The stand of claim 9 wherein the receptacle further comprises a radially extending collar including a plurality of circumferentially spaced pockets, each of the pockets including a vertical aperture for receiving a threaded nut and a radially extending aperture for receiving a bolt for threaded engagement with the threaded nut.

12. The stand of claim 9 wherein the base further comprises a plurality of circumferentially spaced, radial support members, the support members extending outwardly from the exterior sidewall.

13. The stand of claim 9 wherein the base further comprises a plurality of circumferentially spaced support ribs and a centrally disposed interior support ring, the support ribs extending between the lower edge of the interior sidewall and the centrally disposed support ring.

14. The stand of claim 9 wherein the locking ring further comprises a pair of radially opposed shoes including inclined camming surfaces extending upwardly from the bottom of the shoes and wherein the locking lever further comprises cam members for engaging the shoes to compress the locking ring around the receptacle.

15. The stand of claim 9 wherein the locking ring further comprises a spring for biasing the locking ring.

16. The stand of claim 9 wherein the locking ring further comprises a pair of radially opposed shoes including inclined camming surfaces extending upwardly from the bottom of the shoes and wherein the locking lever further comprises cam members for engaging the shoes to compress the locking ring around the receptacle.

17. The stand of claim 9 wherein the locking ring further comprises a spring for biasing the locking ring.

18. A stand for receiving and supporting a cylindrical object such as the bole of a Christmas tree comprising:

a receptacle for receiving and securing the bole of a Christmas tree, the receptacle including a substantially cylindrical sidewall, including a upper, radially outwardly extending collar, a bottom wall including an integrally formed, upwardly extending pointed projection for engaging the bottom of the bole of a Christmas tree, a plurality of circumferentially spaced, radially extending, vertical ribs integrally formed with the sidewall, at least one of the ribs having a radially outwardly extending convex portion extending from below the upper collar to the bottom of the sidewall including a plurality of teeth extending along at least a portion of the circumference of the outwardly extending convex portion;

a base including a truncated, substantially hemispherical interior annular sidewall the sidewall having upper and lower edges, an outwardly flared, exterior sidewall, the interior and exterior sidewalls being joined at the upper portion of the base to form an annular, locking ring receiving collar, a plurality of circumferentially spaced, radial support members, the support members extending outwardly from the exterior sidewall and a plurality of circumferentially spaced support ribs extending inwardly from the lower edge of the interior sidewall, the base being adapted to receive the receptacle;

a split, outwardly biased locking ring comprising an annular inner surface positioned inside the locking ring receiving collar;

the locking ring comprising a plurality of horizontal ridges on the annular inner surface: and a locking lever for engaging the locking ring, the locking lever being selectively moveable to constrict the locking ring and engage the ridges of the locking ring with the teeth of the receptacle to secure the receptacle in the desired angular orientation relative to the base unit.

19. The stand of claim 18 wherein the receptacle further comprises a radially extending collar including a plurality of circumferentially spaced pockets, each of the pockets including a vertical aperture for receiving a threaded nut and a radially extending aperture for receiving a bolt for threaded engagement with the threaded nut.

20. The stand of claim 18 wherein the base further comprises a centrally disposed interior support ring and wherein the support ribs extend between the lower edge of the interior sidewall and the centrally disposed support ring.

* * * * *

UNITED STATES PATENT AND TRADEMARK OFFICE
CERTIFICATE OF CORRECTION

PATENT NO : 5,845,890
DATED : December 8, 1998
INVENTOR(S) : James Earsley et al.

It is certified that error appears in the above-identified patent and that said Letters Patent is hereby corrected as shown below:

On title page, item 54 Title of Patent replace "Swivel Tree Stand" with --Adjustable Tree Stand--.

Col. 1, line 1 replace "Swivel Tree Stand" with --Adjustable Tree Stand--.

Col. 2, line 52 replace "FIG. 7" with --FIG. 6--.

Col. 2, line 54 replace "FIG. 7" with --FIG. 6--.

Signed and Sealed this

Fifteenth Day of June, 1999

*Attest:*

Q. TODD DICKINSON

*Attesting Officer*     *Acting Commissioner of Patents and Trademarks*